F. M. HARSHBERGER.
CLARIFYING APPARATUS.
APPLICATION FILED DEC. 10, 1910.
1,068,767.
Patented July 29, 1913.
2 SHEETS—SHEET 1.
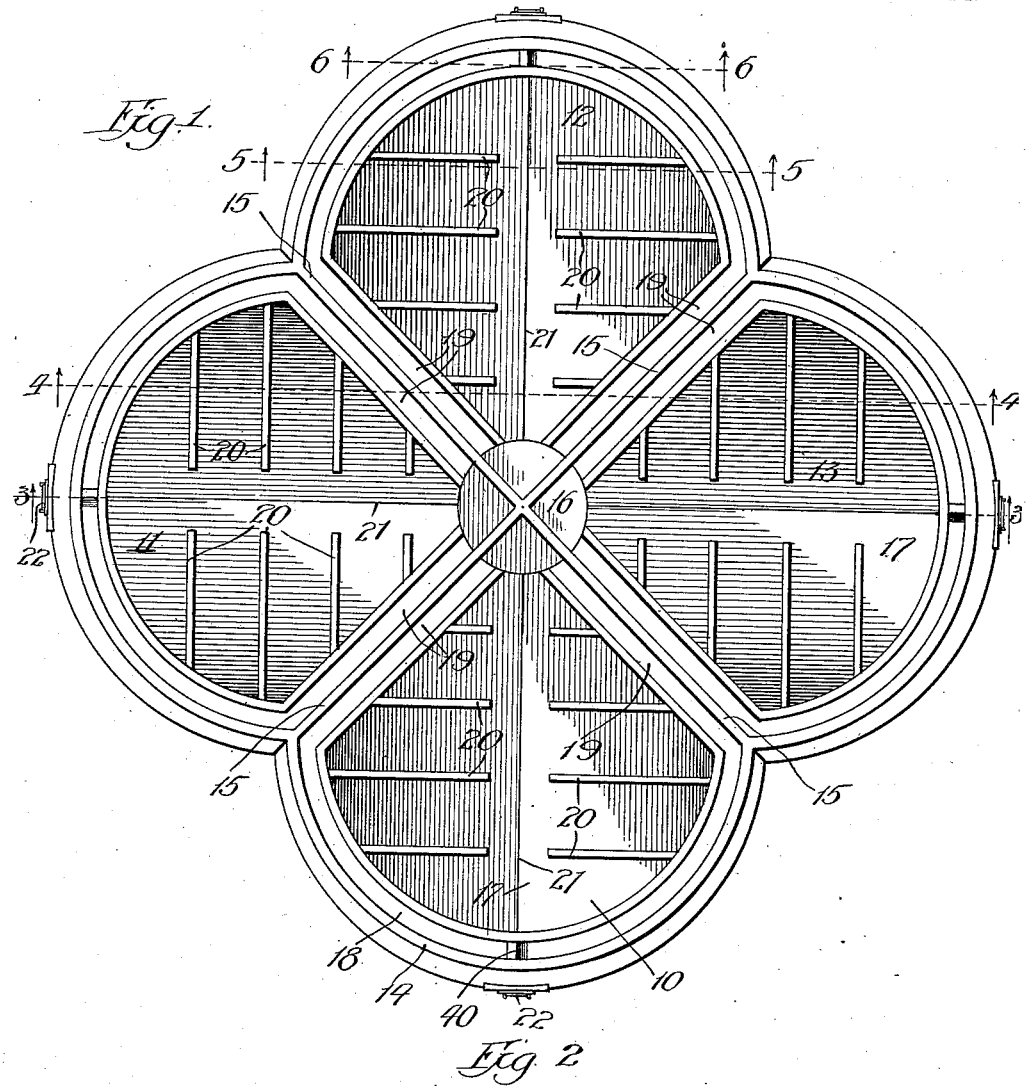

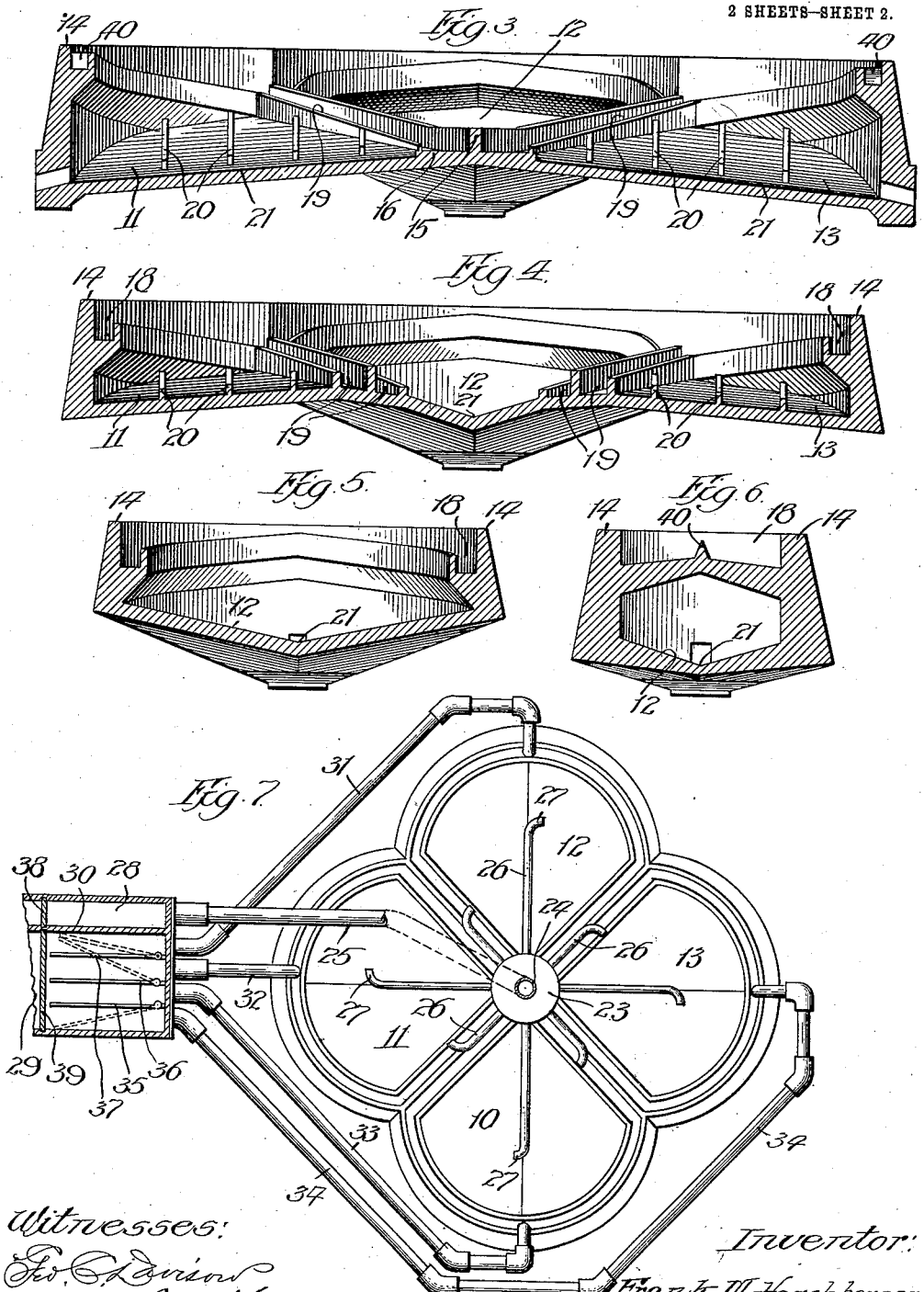

UNITED STATES PATENT OFFICE.

FRANK M. HARSHBERGER, OF LEAD CITY, SOUTH DAKOTA.

CLARIFYING APPARATUS.

1,068,767. Specification of Letters Patent. Patented July 29, 1913.

Application filed December 10, 1910. Serial No. 596,657.

*To all whom it may concern:*

Be it known that I, FRANK M. HARSHBERGER, a citizen of the United States, residing at Lead City, in the county of Lawrence and State of South Dakota, have invented certain new and useful Improvements in Clarifying Apparatus, of which the following is a specification.

My invention relates to clarifying apparatus and is especially adapted for removing sediment from water or other liquids.

It is often desirable to remove sand, silt and the like from large quantities of water in an economical and efficient manner so that the water which passes through a clarifying apparatus may be used for purposes which require pure water. This is particularly true in connection with mining operations where large quantities of water are used and a considerable saving is effected if the same water can be used many times over.

In order to carry out my invention, in a preferred embodiment of the same I employ a large receptacle as a clarifying basin which is divided into a plurality of compartments. The water to be clarified is introduced to the various compartments of this basin in such manner that the sediment is equally distributed between the various compartments. This result is preferably attained by means of a rotating device having a plurality of nozzles through which the water to be clarified passes. Each of these nozzles travels over all of the compartments. The silt or other sediment in the water sinks to the bottom of the basin while the water itself over-flows from the basin thereby effecting a process of decantation. The sediment may be washed out of the various compartments of the settling basin by introducing water into the latter which serves to carry the sediment through an outlet gate which is opened when the sediment is to be thus removed. As will be described in detail hereafter, each compartment of the settling basin is constructed with channels and baffle plates so that the sediment is completely and readily washed through this outlet gate. These and other advantages of my invention will be more readily understood by reference to the accompanying drawings which represent a preferred embodiment of my improvements and in which:

Figure 1 is a plan view of the settling basin, the water distributing mechanism being removed for the sake of clearness. Fig. 2 is a side elevation of the basin shown in Fig. 1. Fig. 3 is a vertical section taken on the line 3—3 of Fig. 1. Fig. 4 is a vertical section taken on the line 4—4 of Fig. 1. Fig. 5 is a vertical section taken on the line 5—5 of Fig. 1. Fig. 6 is a vertical section taken on the line 6—6 of Fig. 1, and Fig. 7 is a diagrammatic plan and partly horizontal sectional view showing the clarifying basin, the water distributing mechanism and the piping by which the water used for purposes of flushing is introduced.

The clarifying basin, which is preferably constructed of concrete, consists of a plurality of compartments 10, 11, 12 and 13. I have represented the number of such compartments as being four, which is a convenient number, but I do not restrict myself to this particular number inasmuch as any other number may be readily employed.

Each of the compartments 10, 11, 12, and 13 has a curved outer wall 14 and the partition walls 15 which extend from the points of junction of the outer walls 14 to the center of the clarifying basin. The central portion 16 of the basin is at a lower level than the upper edges of the outer walls 14 and the partitions 15 slope downwardly to this central portion. The bottom 17 of each chamber slopes downwardly and outwardly toward the wall 14. Just inside of each of the outer walls 14 is formed a channel or conduit 18 which connects at its ends with the conduits 19 leading toward the center of the basin. Each compartment is also provided with parallel baffle plates 20. The bottom of each compartment slopes inwardly toward its central line 21 as is clearly shown in Fig. 1. The baffle plates 20 are interrupted along the central line of each chamber. An outlet gate 22 located on the outside of each wall 14, communicates with each of the chambers 10, 11, 12 and 13 at the outer end of its central line.

As shown in Fig. 7 the rotatable disk 23 is located at the center of the basin and through this disk passes a pipe 24 in communication with pipe 25 through which water may be supplied as will be explained hereafter.

Mounted on the rotatable disk 23, in communication with pipe 24, are the pipes 26 of various lengths. The end of each of these pipes is curved laterally as shown at 27. It will be evident that as water flows outwardly from the pipe 24 through the pipes 26, the curved end or nozzle 27 of each pipe will, by the action of the out-flowing water, cause the disk 23 to be rotated so that each of the nozzles 27 will pass over each of the chambers or compartments 10, 11, 12 and 13.

The water which is supplied to pipe 25 goes through a sluice way 28 which is separated from a second sluice way 29 by the vertical wall 30. The sluice ways 28 and 29 are supplied with water under a head sufficient to carry the same to the basin as will presently be explained. The pipes 31, 32, 33 and 34 communicate with the sluice way 29 in which the gates 35, 36 and 37 are placed so that the water may be deflected into one or more of said pipes; for example, when the gates are in position shown in full lines, water is supplied to all of the four pipes 31, 32, 33 and 34, whereas, if these gates are moved to the positions shown in dotted lines, all the water will flow into pipe 33. The gates 38 and 39 are provided in connection with the sluice ways 28 and 29 respectively and are operated in any well known manner so that while water is being supplied to the sluice way 28, it is cut off from sluice way 29 and vice versa. These radial or diverging partitions 15 constitute also baffles tending to prevent lateral disturbance of the sediment-containing water as it is fed into the basin, and also in flushing.

In each of the channels or conduits 18, is placed a wedge shaped separator 40 located above the central line 21 of each of said compartments. The four pipes 31, 32, 33 and 34 terminate directly above the separators 40 associated with each of the above mentioned compartments. It will thus be apparent that when water flows through any one or more of the pipes 31, 32, 33 and 34, on striking the separator 40, the stream from each pipe will be divided and flow in opposite directions through the channel 18.

Having thus described the construction of my improved apparatus, its operation may now be readily understood. The gate 39 being lowered and the gate 38 raised, water will flow from sluice way 28 through the pipe 25 into the pipe 24 and then outwardly through pipes 26, the curved ends 27 of which cause disk 23 to be rotated. The water flowing from any given pipe is thereby distributed to the different compartments and the sediment in the water gradually settles to the bottom of these compartments. The different lengths of the pipes 26 cause such sediment to be well distributed through each compartment. The water gradually rises in the clarifying basin and finally overflows the upper edges of the walls 14 and a process of decantation thus takes place, all of the sediment remaining in the clarifying basin. The water overflowing from the basin may be collected in a suitable sluice way and this purified water may then be used for any desired purpose. After a considerable amount of sediment has collected in the clarifying basin and it is desired to wash out the latter, the gate 38 is lowered and the gate 39 raised. The main supply of water going through pipe 25 is thereby interrupted and water flows through the pipes 31, 32, 33 and 34 or any desired number of same. This water, as explained before, flows through the channels 18 and overflows the edges of said channels at the highest point to which the sediment has accumulated. This causes the water to be deflected into the main portion of the chamber which is to be cleaned and the sediment is washed toward the central line 21 of said chamber and the gate 22 having been opened, the sediment is carried outwardly through the outlet normally closed by said gate. As the sediment continues to be washed out, the water flowing through channel 18 gradually works farther back carrying into the central line of the chamber sediment which is located nearer to the center of the clarifying basin. The baffle plates 20 serve to direct the water which is thus employed and to prevent the formation of eddies or pockets from which the sediment would not be removed. After the clarifying basin has been thoroughly washed and cleaned out, the gate 29 is lowered, the gate 22 closed and the normal clarifying action takes place as above described.

It will be clear to those skilled in the art that many changes can be made in the detailed construction of the parts which I have described without departing from the spirit or scope of my invention.

What I claim is:—

1. A clarifying apparatus, comprising a settling basin having a closable outlet therefrom, a substantially V-shaped bottom sloping toward said outlet, a channel within said basin and sloping in the opposite direction from the bottom of the same, means for introducing a liquid into said basin whereby the sediment contained in said liquid will settle to the bottom of the basin and the purified liquid will overflow therefrom, and means for introducing into said channel a flushing liquid whereby the sediment will be washed toward the central line of the bottom of said basin and thence through said outlet when the latter is opened, substantially as described.

2. A clarifying apparatus, comprising a settling basin having a channel therein, portions of said channel sloping in opposite directions, a separator in said channel, and means for introducing a flushing liquid into said channel at the point of location of said separator whereby the liquid is divided and flows through said channel in opposite directions, substantially as described.

3. In a clarifying apparatus, the combination of a settling basin having a sloping bottom and an outlet at substantially its lowest point, said basin having a rim adapted to permit clarified water to overflow the same, a flushing channel within said basin and sloping in the opposite direction from the bottom thereof, means for introducing a sediment-containing liquid into said basin, and means for flushing sediment through said outlet when the same is opened, substantially as described.

4. In a clarifying apparatus, the combination of a settling basin having an outwardly sloping bottom and a rim adapted to permit clarified water to overflow therefrom, an inwardly sloping flushing channel within said basin, a plurality of baffle plates extending partially across said basin, means for introducing a sediment-containing liquid into said basin, and means for introducing a flushing liquid into said channel, substantially as described.

5. In a clarifying apparatus, the combination of a settling basin having a rim adapted to permit clarified water to overflow therefrom, a plurality of substantially radial baffles forming compartments in said basin, each compartment having a sloping bottom and an outlet adapted to be opened and closed, means for substantially equally distributing a sediment-containing liquid into said compartments, and means for delivering a flushing liquid into said channels and basin, substantially as described.

6. In a clarifying apparatus, the combination of a settling basin having substantially radial baffle plates dividing said basin substantially into compartments, each of said compartments having an outwardly sloping bottom, said baffles formed to provide channels from the rim portion of said basin toward the center thereof, substantially as described.

7. In a clarifying apparatus, the combination of a settling basin having a rim adapted to permit clarified water to overflow therefrom, the central portion of the bottom of said basin being higher than the outer portions thereof, a plurality of baffles diverging from the central portion of said basin toward the rim portion thereof, said baffles also constituting channels adapted to convey flushing water, means for distributing water substantially uniformly between said baffles, and a plurality of outlets for discharging water from said basin, substantially as described.

8. In a clarifying apparatus, the combination of a settling basin having an overflow rim and substantially radial baffles dividing said basin substantially into compartments, said baffles formed to constitute inwardly sloping channels, the bottom of said basin sloping from the central portion outwardly, and rotatable means for distributing water substantially equally into said compartments, substantially as described.

FRANK M. HARSHBERGER.

Witnesses:
 HENRY M. HUXLEY,
 D. M. FORD.

Copies of this patent may be obtained for five cents each, by addressing the "Commissioner of Patents, Washington, D. C."